(12) United States Patent
Schuster

(10) Patent No.: US 7,065,132 B2
(45) Date of Patent: Jun. 20, 2006

(54) MEMORY-FREE RETIMER

(75) Inventor: Peter Schuster, Reichenbach (DE)

(73) Assignee: Hirschmann Electronics GmbH & Co. KG, Neckartenzlingen (DE)

( * ) Notice: Subject to any disclaimer, the term of this patent is extended or adjusted under 35 U.S.C. 154(b) by 0 days.

(21) Appl. No.: 10/917,533

(22) Filed: Aug. 12, 2004

(65) Prior Publication Data

US 2005/0084049 A1    Apr. 21, 2005

(30) Foreign Application Priority Data

Aug. 12, 2003  (DE) ................. 103 36 992

(51) Int. Cl.
*H04B 3/36*  (2006.01)
*H03K 5/01*  (2006.01)

(52) U.S. Cl. .............. 375/211; 327/165; 375/372; 375/363

(58) Field of Classification Search ................ 375/211, 375/372, 363; 370/300; 340/146.2; 382/151, 382/288; 327/165, 141; 714/746
See application file for complete search history.

(56) References Cited

U.S. PATENT DOCUMENTS 6,100,737 A * 8/2000 Heiles ................. 327/165
6,791,977 B1 * 9/2004 Biman et al. .......... 370/357

FOREIGN PATENT DOCUMENTS

DE        43 34 204       4/1995

\* cited by examiner

*Primary Examiner*—Michael Horabik
*Assistant Examiner*—William Bangachon
(74) *Attorney, Agent, or Firm*—Andrew Wilford

(57) ABSTRACT

A method of transmitting digital signals which are passed via a communication system by means of a retimer between an input and an output, whereby according to the invention the data packet applied to the input is scanned with respect to the individual bits and within the individual bits and preferably at the center and the scanned data level is transmitted immediately to the output.

5 Claims, 2 Drawing Sheets

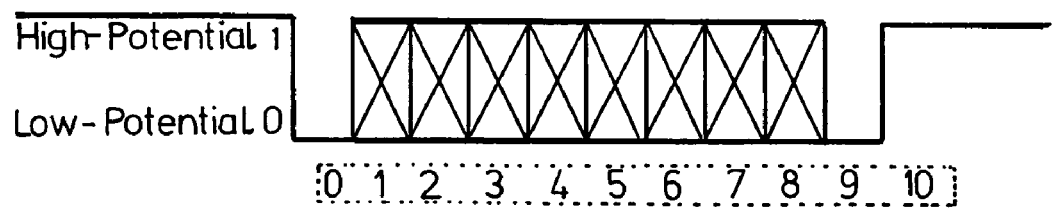
FIG.1
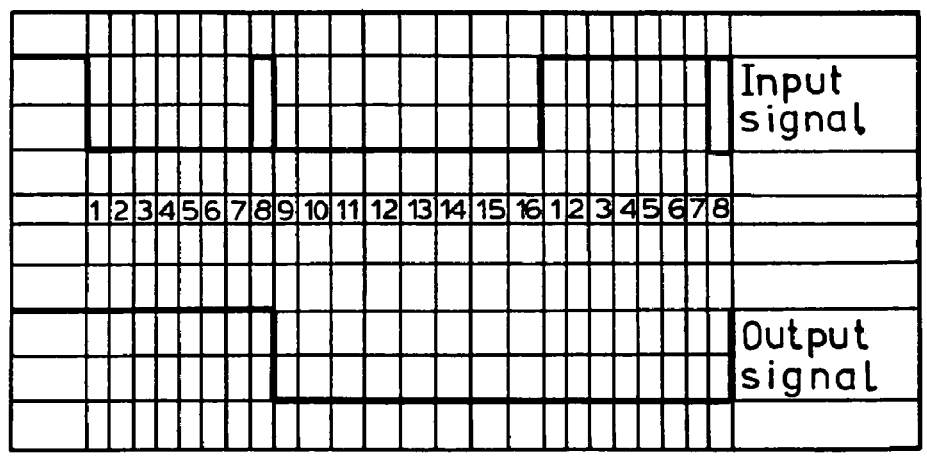
FIG.2
FIG.3

MEMORY-FREE RETIMER

CROSS REFERENCE TO RELATED APPLICATION

This application is related under 35 USC 119 and the International Convention to German national application 103 36 992.9 filed 12 Aug. 2003.

FIELD OF THE INVENTION

The invention relates to a method of transmitting data signals in a transmission system by means of a retimer.

BACKGROUND OF THE INVENTION

Star couplers, hubs, repeaters and the like are communications units whose significant object is to transmit the data signals over transmission systems like copper cables, glass fibers, radio-wave paths and the like, that is to receive such signals and to reforward them to connected final devices or further transmission systems. The data to be transmitted is not thereby changed. The data is usually in the form of data packets with a certain number of characters (bits). The number of bits which must be present at least in a data packet and the magnitude of the mechanism number is determined by the various standards, for example, the field bus standard EN 50170 (containing PROFIUS according to German Industrial Standard DIN 19245) for the different data protocols. Between each data packet and the next is a certain temporal gap in which nothing should be transmitted. The transmission systems here under consideration do not vary the data packets and are based upon the understanding that the data packets received lie within the specification of the given protocol and thus are error-free.

Apart from the data transmission, an error-free regeneration of the received data is an important object. Each data signal is influenced in various degrees and ways namely during the transmission. On the one hand, the signal amplitudes can be varied (for example by damping or pass frequency of the cable) while on the other hand however the position in time of a signal state alternation may vary (bit duration distortion, jitter and the like). The signal amplitudes are again regenerated by amplifiers and frequency components while for the correction of the point in time of the signal state change or timing so-called retimers are used.

In the state of the art, retimers are to be found which operate substantially in accordance with the following principle: Incoming data is sensed character for character and read into a memory. Simultaneously the bits are read out with the internally generated data clock bit for bit from the memory and transmitted. With large differences between the data clock of the incoming data packet and the internal clock or cadence, transmission errors can arise. If the internal clock is too fast, it seeks to transmit bits which have not been received. If the internal clock is too slow, the memory will fill. The memory is comparable to a water reservoir whose inflowing water quantity does not equal the. outflow. As the permissible cadence or clock difference and the maximum data packet length are known, the requisite memory size can be simply calculated. The greater the size of the memory required, the greater will also be the transit time since a part of the memory always must be initially filled with characters before transmission can commence because otherwise there is the danger that the memory will run empty. Thus each such retimer has the drawback that it produces in a disadvantageous manner a transit time delay of several bit periods which is not acceptable in more modern data communications and under many time-critical situations.

OBJECT OF THE INVENTION

The invention has, therefore, as its object to so improve a method of the type described that the transit time can be reduced and the communications speed thus substantially increased.

SUMMARY OF THE INVENTION

According to the invention the data packet arriving at the input has its individual bits therewithin and preferably at the middle, sensed and the sensed data level immediately transmitted to the output. This method according to the invention has the advantage that a retimer can be used which requires no memory so that transit time delays can be significantly below several bit periods or bit durations. That means that with the method according to the invention the transit time can remain smaller than a bit period or duration. A further important advantage is that the internal clock (of the retimer) and the external clock (of the communications system) will differ only insignificantly (for example in a range of several 100 ppm or about several percent). This allows the method according to the invention to operate not only with smaller transit delays but also permits substantially more flexible applications within the communication system.

The scanning rate can be a multiple of the data clock rate, especially the internal data clock. Advantageously, the predetermined time period over which the scanning occurs, is half the multiple of the data clock rate. The center of a bit of the data word can be determined and then, by establishing that the scanning point deviates from the center, the output time point can be shifted by a predetermined time interval until the scanning point again lies at the center. The change (shortening or lengthening) of the predetermined time interval can be effected after each state change of the signal at the input.

BRIEF DESCRIPTION OF THE DRAWING

An embodiment of the invention, although the invention is not limited to this embodiment, is described in greater detail below in connection with the Figure. In the drawing:

FIG. 1 is a diagram of an exemplary configuration of a data packer;

FIG. 2 is a diagram of the data level of the individual data word;

FIG. 3 is a diagram illustrating the sensing of a received data word; and

SPECIFIC DESCRIPTION

Figure 4:
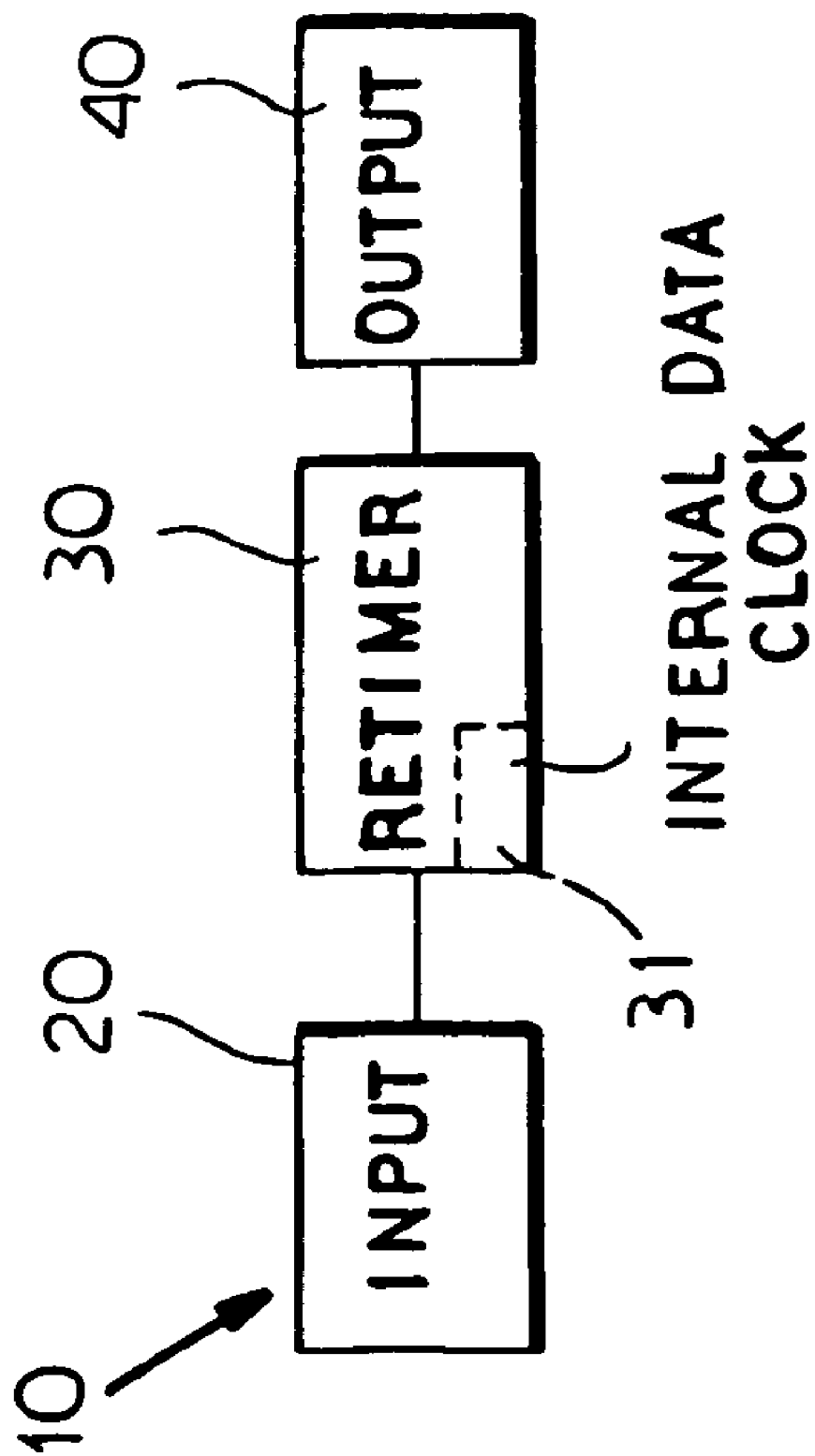
FIG. 4 is a block diagram of the system.

FIG. 1 shows by way of example the configuration of a data packet as it is for example described in the field bus standard EN 50170. This is a format of fixed length without a data field, whereby the individual components (data word) are describable as follows:

SD 1: Start delimiter
DA: Target address
SA: Source address
FC: Function code
FCS: Frame check sequence
ED: End delimiter.

FIG. 2 shows the data levels of the individual data words as they for example have been described in FIG. 1. Such a data word has either a high potential or low potential whereby in FIG. 2 the illustrated data word is comprised of 11 bits. The bit 0 has the level 0 (that is low potential) so that it in this case can represent a start bit. The bits 1 to 8 are data bits which depending upon their content can have low potential or high potential. In the data word of FIG. 2 the bit 10 is a stop bit which always is of high potential. The data word shown for example in FIG. 2 is connected within the data packet either with a further data word or possibly a data packet pause.

The input signal shown in the Figure (received data word) that is applied at an input 20 (of the system ID shown in FIG. 4), has initially "high potential" and then alternates its flank to the indicated "low potential". At this location, the communication system as mentioned has a clock exactly like the retimer 30 with its internally generated clock 31. The cadence of the received signal and the internally generated data clocking (from a quartz clock or oscillator) are in practice never 100%. The quality of the quartz is given generally to 50 ppm to 100 ppm (parts per million). This difference between the internal and external clock means that with large blocks of data the memory. of a retimer must be large enough in terms of bits to prevent an overflow (when the external clock is faster than the internal clock) or runs empty (when the internal clock is greater than the external clock).

To avoid this, according to the invention the data word of the data signal applied at the input (bit) is sensed at the beginning of a state change with a predetermined scanning rate. This can for example be accomplished in that the scanning rate can be a multiple of the data clock, especially the internal data clock. As a consequence a count is generated within this internal clock which is a multiple of the data clock, for example 16 times the data clock. At a change of state of the first bit of the received data, the counter is started and counted until a predetermined duration is reached (middle of the bit).

The predetermined duration is in an especially advantageous manner half the multiple of the data clock which in the case of a multiple of 16 times the data clock is 8, i.e. half of 16. Since the counter is started with the change of state to count up for the count duration (half of 16=8) it reads the state of the data word and transmits that count immediately to the output. The counter then runs further to the end of the count, for example, until it reaches 16) and begins to count anew so that the process already described is repeated. This means that after the start of the count, the state of the middle of the next counting process is provided for an output signal. In the case in which the external clock of the received data corresponds precisely to the internal clock 31 of the retimer 30, the scanning point is always in the middle of the data word (counter has counted up to 8). When however, as already described, the internal clock can deviate from the external clock, the scanned point as a rule will always fall outside the center or middle.

To compensate for deviation of the scanning point from a predetermined point of the data word (here especially the bit center) the invention provides that the center of a bit of the data word is determined and then, upon establishing that the scanned point in time deviates from the center, the output signal (at 40 in FIG. 4) is shortened or lengthened, by predetermined time increments until the scanning point again lies in the center.

With the reference to the example shown in FIG. 3, it can be seen that the counter is used, in addition to determining the bit center, to establish the point in time at which a state change of the input signal (from high potential to low potential or low potential to high potential) occurs.

In the ideal case, that is in which the internal clock is equal to the external clock, the state change of the input signals always occurs only between the counter states 16 and 1. If it is thus determined that the input signal varies in state between two other count values, it can be immediately determined that the scanning point is also no longer in the center (count value=8). It can then lie for example at a count of 7 or 9. From a determination of where the signal lies, the count can be shortened or lengthened for the predetermined duration counting up the next time, that is by way of example only to 15 or 17. As a result the scanning point in time is shifted back into the middle. The output signal is thus shortened or lengthened by the duration of one count interval.

It is thus ensured that data transmission of the data word between the input and the output is effected as rapidly as possible and the transit time will remain smaller than one bit interval as can also be seen from the Figure based upon the shift in time between the input signal and the output signal. Simultaneously the method described allows a compensation for deviation between the internal and external clock which can differ from one another by several percent. In an especially advantageous way, the change (lengthening or shortening) of the predetermined duration after which change of the signal at the input is so carried out that a dynamic compensation of even large clock differences is obtained.

So that there will be a reliable synchronization between the input and output signal, a state alternation (signal change) is required. Ideal in this case are especially all coding processes which are free from direct voltages like Manchester coding, FSK Modulation and the like. A further advantage is the lag-free synchronization of the clock of the input signal, that is the clock of the communication system so that even signals which derive from different sources or different communications systems can be processed. The greatest advantage of the method of the invention is that the transit time between input 20 and output 40 is smaller than one bit duration and typically corresponds to about one-half the bit duration.

The invention claimed is:

1. A method of transmitting data signals supplied over a communication system by means of a retimer between an input and an output for said retimer, comprising scanning individual bits of a data packet applied to an input has the individual bits scanned, at the center, to determine respective scanned data levels for said individual bits and transmitting the scanned data levels immediately to the output, each bit being scanned to a middle of the respective bit, the center of a bit of the data word being determined and then, by establishing that the scanning point deviates from the center, the output time point being shifted by a predetermined time interval until the scanning point again lies at the center.

2. The method according to claim 1 wherein the scanning rate is a multiple of the data clock rate.

3. The method according to claim 2 wherein each bit is scanned for a predetermined time period which is half the multiple of the data clock rate.

4. The method according to claim 1 wherein the change in terms of shortening or lengthening of the predetermined time interval is effected after each state change of the signal at the input.

5. The method defined in claim 2 wherein the scanning rate is a multiple of a clock rate of an internal data clock of said retimer.

* * * * *